United States Patent

Murao

[19]

[11] Patent Number: 6,141,452
[45] Date of Patent: *Oct. 31, 2000

[54] APPARATUS FOR COMPRESSING AND RESTORING IMAGE DATA USING WAVELET TRANSFORM

[75] Inventor: Kohei Murao, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,695

[22] Filed: Mar. 20, 1997

[30] Foreign Application Priority Data

May 13, 1996 [JP] Japan .................................. 8-117257

[51] Int. Cl.[7] .................................................. G06K 9/46
[52] U.S. Cl. ........................... 382/240; 382/233; 382/250
[58] Field of Search ................................... 382/250, 244, 382/232, 233, 235, 240

[56] References Cited

U.S. PATENT DOCUMENTS

| 5,400,154 | 3/1995 | Takayama et al. | 358/525 |
|---|---|---|---|
| 5,546,477 | 8/1996 | Knowles et al. | 382/242 |
| 5,561,464 | 10/1996 | Park | 348/397 |
| 5,602,589 | 2/1997 | Vishwanath et al. | 348/398 |
| 5,661,822 | 8/1997 | Knowles et al. | 382/233 |
| 5,710,835 | 1/1998 | Bradley | 382/233 |
| 5,748,786 | 5/1998 | Zandi et al. | 382/240 |
| 5,841,890 | 11/1998 | Kraske | 382/131 |

*Primary Examiner*—Bhavesh Mehta
*Assistant Examiner*—Kanji Patel
*Attorney, Agent, or Firm*—Staas & Halsey LLP

[57] ABSTRACT

An apparatus for transforming image data using a Wavelet transform, including an image compressing apparatus having a Wavelet transforming unit for compressing digitized image data and an image restoring apparatus having an inverse Wavelet transforming unit for restoring image data compressed by the image compressing apparatus. The Wavelet transforming unit in the image compressing apparatus includes a unit for extending image data area to make the number of data of the object of transform in horizontal and vertical directions, with every one octave of resolution lowered when a Wavelet transform is conducted hierarchically based on multiple resolution analysis, thereby conducting a Wavelet transform on data of the interpolated image data area. The inverse Wavelet transforming unit in the image restoring apparatus includes a unit for reducing redundant portion generated by extension of image data area in the image data compression, with every one octave of resolution increased. Based on the above structure, it is possible to minimize zero area to reduce the computing time and capacity of memory used. It is also possible to estimate signal-to-noise ratio when data is reduced.

19 Claims, 24 Drawing Sheets

Fig.1a

BRIGHTNESS INFORMATION OF ORIGINAL IMAGE (8×8 PIXELS)

| 89 | 95  | 101 | 119 | 130 | 146 | 137 | 123 |
|----|-----|-----|-----|-----|-----|-----|-----|
| 93 | 99  | 103 | 121 | 129 | 144 | 140 | 131 |
| 91 | 102 | 103 | 119 | 125 | 140 | 138 | 132 |
| 91 | 103 | 110 | 120 | 132 | 149 | 140 | 135 |
| 88 | 100 | 109 | 127 | 138 | 151 | 145 | 140 |
| 81 | 99  | 111 | 123 | 137 | 149 | 158 | 150 |
| 73 | 95  | 129 | 138 | 144 | 159 | 170 | 160 |
| 75 | 93  | 100 | 141 | 158 | 161 | 155 | 130 |

Fig.1b

DATA AFTER TRANSFORM PROCESSING

| 990 | 133 | 69  | -25 | -47 | -7  | 6   | 14 |
|-----|-----|-----|-----|-----|-----|-----|----|
| 17  | -2  | 50  | -25 | -23 | -8  | -2  | 8  |
| 39  | -5  | 6   | 7   | -28 | -4  | -3  | 3  |
| -15 | 0   | -13 | -1  | -45 | 3   | -1  | 9  |
| -11 | 0   | -9  | -7  | 7   | 0   | -1  | 0  |
| 0   | 0   | -2  | -7  | 0   | -1  | 0   | 1  |
| -3  | 0   | 4   | 3   | 3   | -2  | 1   | -2 |
| 22  | 1   | 11  | 0   | -9  | 16  | -7  | 2  |

Fig.1c

DATA AFTER REDUCTION PROCESSING

| 990 | 133 | 69 | -25 | -47 | 0  | 0 | 14 |
|-----|-----|----|-----|-----|----|---|----|
| 17  | 0   | 50 | -25 | -23 | 0  | 0 | 0  |
| 39  | 0   | 0  | 0   | -28 | 0  | 0 | 0  |
| -15 | 0   | 0  | 0   | -45 | 0  | 0 | 0  |
| 0   | 0   | 0  | 0   | 0   | 0  | 0 | 0  |
| 0   | 0   | 0  | 0   | 0   | 0  | 0 | 0  |
| 0   | 0   | 0  | 0   | 0   | 0  | 0 | 0  |
| 22  | 0   | 0  | 0   | 0   | 16 | 0 | 0  |

Fig.2

RESTORED DATA

| 87 | 96  | 110 | 123 | 136 | 149 | 141 | 132 |
|----|-----|-----|-----|-----|-----|-----|-----|
| 93 | 94  | 106 | 114 | 127 | 138 | 129 | 128 |
| 91 | 96  | 109 | 119 | 131 | 143 | 138 | 137 |
| 91 | 96  | 110 | 121 | 132 | 144 | 141 | 142 |
| 85 | 100 | 110 | 126 | 137 | 148 | 144 | 144 |
| 81 | 102 | 110 | 130 | 140 | 154 | 158 | 147 |
| 82 | 93  | 126 | 125 | 145 | 160 | 164 | 156 |
| 76 | 100 | 110 | 139 | 150 | 166 | 154 | 126 |

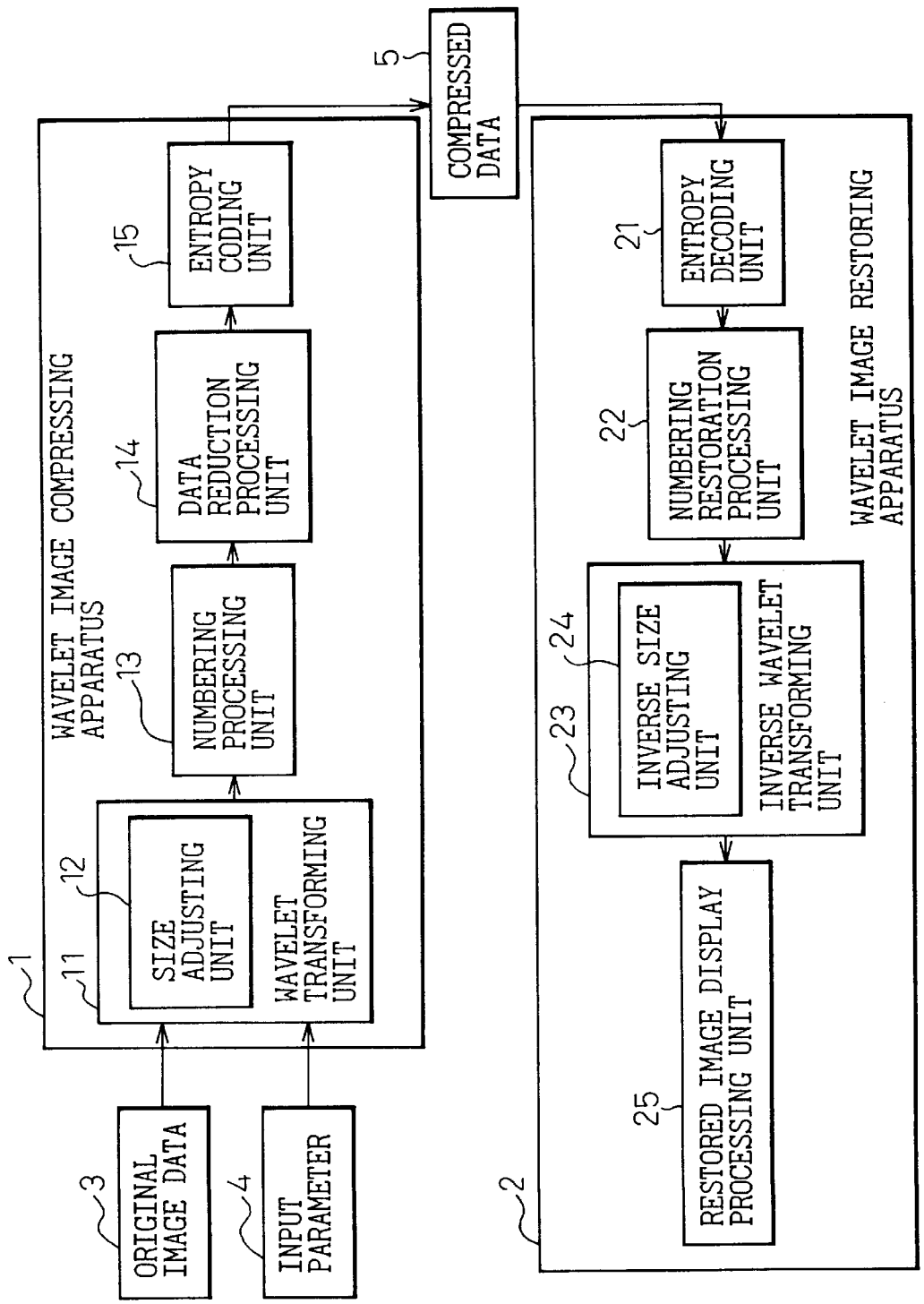

Fig.6

- Daubechies N=2
  $p_0=0.4829629131445341$, $p_1=0.83651630373 78079$,
  $p_2=0.2241438680420134$, $p_3=-0.1294095225512604$
  $q_0=-p_3$, $q_1=p_2$, $q_2=-p_1$, $q_3=p_0$

- Daubechies N=3
  $p_0=0.3326705529500825$, $p_1=0.8068915093110924$,
  $p_2=0.4598775021184914$, $p_3=-0.1350110200102546$,
  $p_4=-0.0854412738820267$, $p_5=0.0352262918857095$
  $q_0=-p_5$, $q_1=p_4$, $q_2=-p_3$, $q_3=p_2$, $q_4=-p_1$, $q_5=p_0$

- Coiflet K=1
  $p_0=-0.051429728471$, $p_1=0.238929728471$,
  $p_2=0.602859456942$, $p_3=0.272140543058$,
  $p_4=-0.051429972847$, $p_5=-0.011070271529$
  $q_0=-p_5$, $q_1=p_4$, $q_2=-p_3$, $q_3=p_2$, $q_4=-p_1$, $q_5=p_0$

ORIGINAL IMAGE

EXTENSION

INTERPOLATION & TRANSFORM

EXTENSION (x DIRECTION)

SHIFT & INTERPOLATION

TRANSFORM

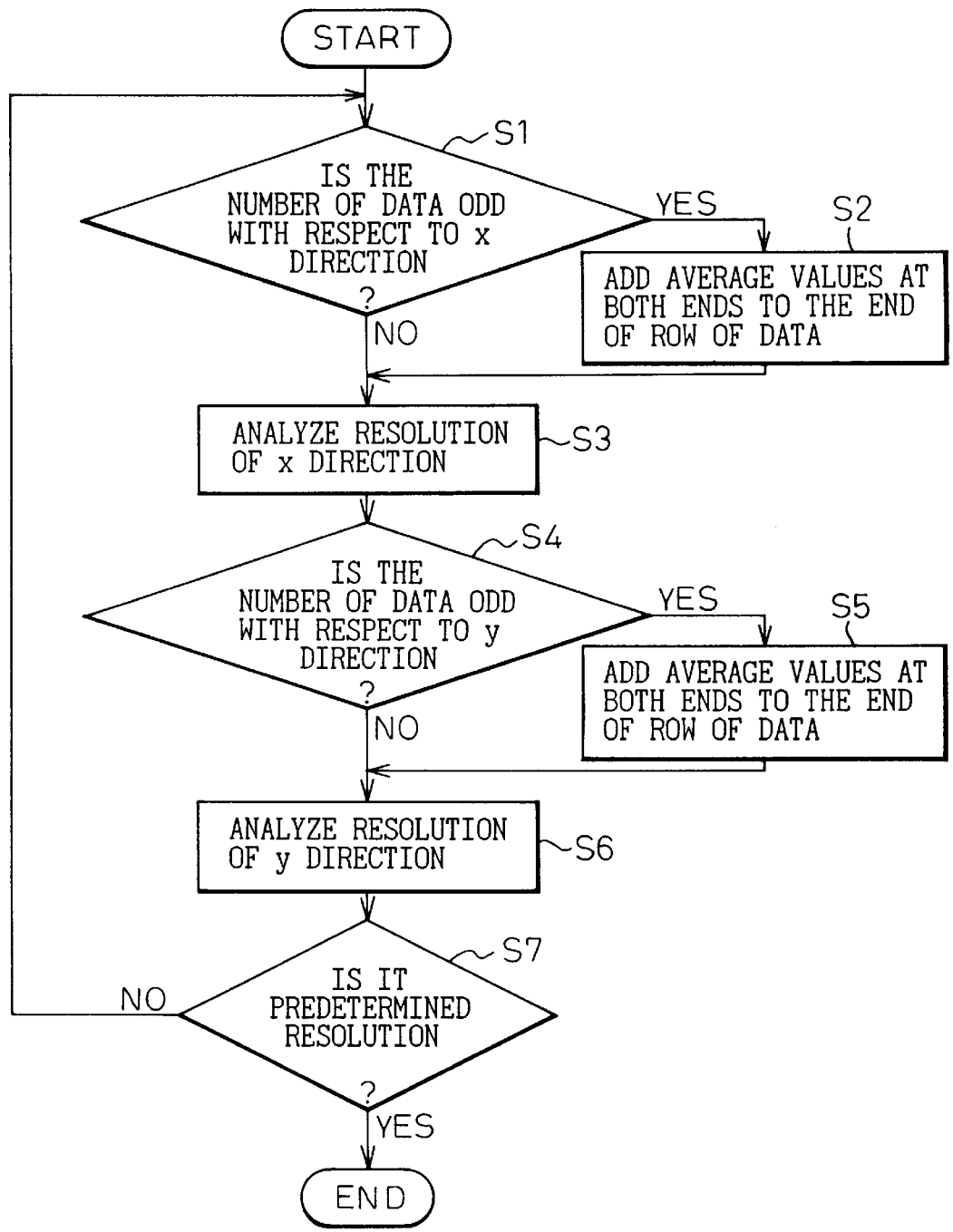

ORIGINAL IMAGE

EXTENSION & INTERPOLATION

TRANSFORM

TRANSFORM

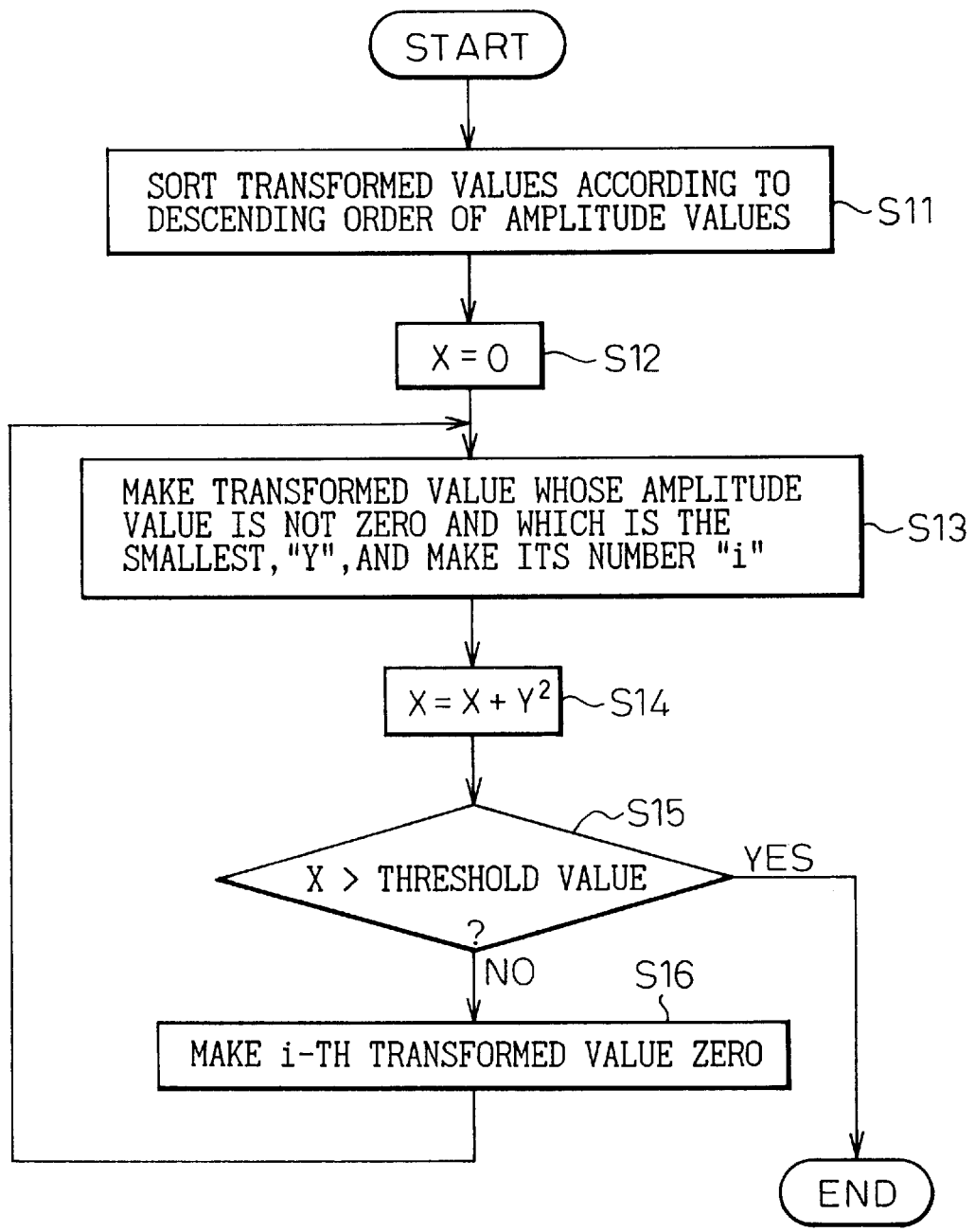

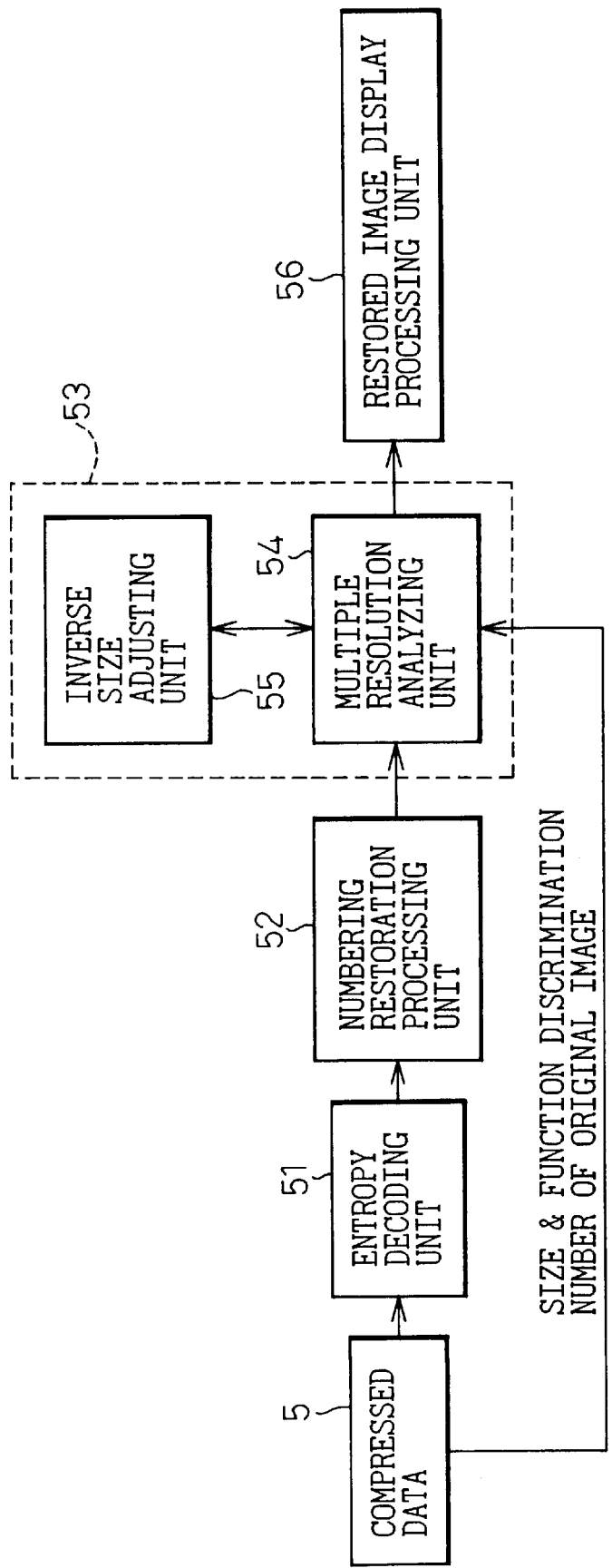

Fig.13a

ORIGINAL IMAGE (5×6 PIXELS)

| 89 | 101 | 130 | 146 | 123 |
|----|-----|-----|-----|-----|
| 93 | 103 | 129 | 144 | 131 |
| 91 | 110 | 132 | 149 | 135 |
| 88 | 109 | 138 | 151 | 140 |
| 73 | 129 | 144 | 159 | 160 |
| 75 | 100 | 158 | 161 | 130 |

Fig.13b

EXTENSION OF AREA (8×8)

| 89 | 101 | 130 | 146 | 123 | 0 | 0 | 0 |
|----|-----|-----|-----|-----|---|---|---|
| 93 | 103 | 129 | 144 | 131 | 0 | 0 | 0 |
| 91 | 110 | 132 | 149 | 135 | 0 | 0 | 0 |
| 88 | 109 | 138 | 151 | 140 | 0 | 0 | 0 |
| 73 | 129 | 144 | 159 | 160 | 0 | 0 | 0 |
| 75 | 100 | 158 | 161 | 130 | 0 | 0 | 0 |
| 0  | 0   | 0   | 0   | 0   | 0 | 0 | 0 |
| 0  | 0   | 0   | 0   | 0   | 0 | 0 | 0 |

Fig.13c

DATA AFTER TRANSFORM PROCESSING

| 465  | -26  | -183 | 213  | 2   | 0  | 4   | 0   |
|------|------|------|------|-----|----|-----|-----|
| 54   | 6    | -142 | 157  | 38  | 4  | 82  | -22 |
| -155 | -176 | 116  | -130 | 27  | 5  | 96  | -25 |
| 30   | 40   | -25  | 17   | 11  | 21 | 82  | -23 |
| 2    | 47   | 75   | 19   | 8   | 2  | 15  | -4  |
| 0    | 3    | 0    | 0    | 0   | -2 | 0   | 0   |
| -3   | 13   | 5    | 11   | -15 | -7 | 19  | -2  |
| 0    | -49  | -84  | -23  | -2  | -5 | -21 | 6   |

Fig.13d

DATA AFTER REDUCTION PROCESSING

| 465 | -26 | -183 | 213 | 0 | 0 | 0 | 0 |
|---|---|---|---|---|---|---|---|
| 54 | 0 | -142 | 157 | 38 | 0 | 82 | -22 |
| -155 | -176 | 116 | -130 | 27 | 0 | 96 | -25 |
| 30 | 40 | -25 | 0 | 0 | 21 | 82 | -23 |
| 0 | 47 | 75 | 19 | 0 | 0 | 0 | 0 |
| 0 | 0 | 0 | 0 | 0 | 0 | 0 | 0 |
| 0 | 0 | 0 | 0 | 0 | 0 | 19 | 0 |
| 0 | -49 | -84 | -23 | 0 | 0 | -21 | 0 |

Fig.13e

RESTORED DATA (8×8)

| 82 | 104 | 129 | 153 | 111 | 5 | 4 | 0 |
|---|---|---|---|---|---|---|---|
| 95 | 100 | 126 | 146 | 139 | 0 | 0 | 0 |
| 90 | 111 | 128 | 146 | 136 | 4 | 2 | 0 |
| 90 | 118 | 129 | 145 | 141 | 7 | 3 | 1 |
| 74 | 115 | 144 | 155 | 153 | 0 | 2 | 1 |
| 63 | 115 | 160 | 170 | 131 | 0 | 1 | 1 |
| 0 | 0 | 6 | 1 | 2 | 0 | 0 | 3 |
| 0 | 0 | 0 | 3 | 0 | 0 | 3 | 0 |

Fig.13f

RESTORED DATA (5×6)

| 82 | 104 | 129 | 153 | 111 |
|---|---|---|---|---|
| 95 | 100 | 126 | 146 | 139 |
| 90 | 111 | 128 | 146 | 136 |
| 90 | 118 | 129 | 145 | 141 |
| 74 | 115 | 144 | 155 | 153 |
| 63 | 115 | 160 | 170 | 131 |

Fig.14a

ORIGINAL IMAGE (5×6 PIXELS)

| 89 | 101 | 130 | 146 | 123 |
|----|-----|-----|-----|-----|
| 93 | 103 | 129 | 144 | 131 |
| 91 | 110 | 132 | 149 | 135 |
| 88 | 109 | 138 | 151 | 140 |
| 73 | 129 | 144 | 159 | 160 |
| 75 | 100 | 158 | 161 | 130 |

Fig.14b

EXTENSION & INTERPOLATION IN x DIRECTION

| 89 | 101 | 130 | 146 | 123 | 106 | 0 |
|----|-----|-----|-----|-----|-----|---|
| 93 | 103 | 129 | 144 | 131 | 112 | 0 |
| 91 | 110 | 132 | 149 | 135 | 113 | 0 |
| 88 | 109 | 138 | 151 | 140 | 114 | 0 |
| 73 | 129 | 144 | 159 | 160 | 117 | 0 |
| 75 | 100 | 158 | 161 | 130 | 103 | 0 |
| 0  | 0   | 0   | 0   | 0   | 0   | 0 |

Fig.14c

MRA PROCESSING WITH RESPECT TO x DIRECTION

| 155 | 138 | 199 | -13 | 4  | 2  | 0 |
|-----|-----|-----|-----|----|----|---|
| 164 | 141 | 198 | -13 | 3  | 7  | 0 |
| 166 | 146 | 204 | -19 | 2  | 8  | 0 |
| 169 | 145 | 210 | -22 | 7  | 10 | 0 |
| 174 | 155 | 223 | -47 | 5  | 23 | 0 |
| 152 | 134 | 227 | -24 | 22 | 3  | 0 |
| 0   | 0   | 0   | 0   | 0  | 0  | 0 |

Fig.14d

MRA PROCESSING WITH RESPECT TO y DIRECTION

| 225 | 200 | 317 | -45 | 22 | 13 | 0 |
|---|---|---|---|---|---|---|
| 228 | 199 | 280 | -19 | 4 | 7 | 0 |
| 241 | 209 | 295 | -35 | 5 | 17 | 0 |
| -6 | -2 | -8 | 7 | -3 | -4 | 0 |
| 0 | 3 | 0 | 0 | -2 | 0 | 0 |
| 13 | 13 | 4 | -19 | -7 | 15 | 0 |
| 0 | 0 | 0 | 0 | 0 | 0 | 0 |

Fig.14e

SHIFT

| 225 | 200 | 317 | 0 | -45 | 22 | 13 |
|---|---|---|---|---|---|---|
| 228 | 199 | 280 | 0 | -19 | 4 | 7 |
| 241 | 209 | 295 | 0 | -35 | 5 | 17 |
| 0 | 0 | 0 | 0 | 0 | 0 | 0 |
| -6 | -2 | -8 | 0 | 7 | -3 | -4 |
| 0 | 3 | 0 | 0 | 0 | -2 | 0 |
| 13 | 13 | 4 | 0 | -19 | -7 | 15 |

Fig.14f

INTERPOLATION IN x DIRECTION

| 225 | 200 | 317 | 271 | -45 | 22 | 13 |
|---|---|---|---|---|---|---|
| 228 | 199 | 280 | 254 | -19 | 4 | 7 |
| 241 | 209 | 295 | 268 | -35 | 5 | 17 |
| 0 | 0 | 0 | 0 | 0 | 0 | 0 |
| -6 | -2 | -8 | 0 | 7 | -3 | -4 |
| 0 | 3 | 0 | 0 | 0 | -2 | 0 |
| 13 | 13 | 4 | 0 | -19 | -7 | 15 |

Fig.14g

MRA PROCESSING WITH RESPECT TO x DIRECTION

| 404 | 312 | -9 | 60 | -45 | 22 | 13 |
|---|---|---|---|---|---|---|
| 373 | 306 | 1 | 38 | -19 | 4 | 7 |
| 393 | 323 | 2 | 39 | -35 | 5 | 17 |
| 0 | 0 | 0 | 0 | 0 | 0 | 0 |
| -6 | -2 | -8 | 0 | 7 | -3 | -4 |
| 0 | 3 | 0 | 0 | 0 | -2 | 0 |
| 13 | 13 | 4 | 0 | -19 | -7 | 15 |

Fig.14h

INTERPOLATION IN y DIRECTION

| 404 | 312 | -9 | 60 | -45 | 22 | 13 |
|---|---|---|---|---|---|---|
| 373 | 306 | 1 | 38 | -19 | 4 | 7 |
| 393 | 323 | 2 | 39 | -35 | 5 | 17 |
| 399 | 317 | -3 | 50 | 0 | 0 | 0 |
| -6 | -2 | -8 | 0 | 7 | -3 | -4 |
| 0 | 3 | 0 | 0 | 0 | -2 | 0 |
| 13 | 13 | 4 | 0 | -19 | -7 | 15 |

Fig.14i

MRA PROCESSING WITH RESPECT TO y DIRECTION

| 564 | 451 | -4 | 69 | -45 | 22 | 13 |
|---|---|---|---|---|---|---|
| 544 | 438 | -2 | 63 | -19 | 4 | 7 |
| 18 | 0 | -7 | 16 | -35 | 5 | 17 |
| 0 | 8 | 5 | -6 | 0 | 0 | 0 |
| -6 | -2 | -8 | 0 | 7 | -3 | -4 |
| 0 | 3 | 0 | 0 | 0 | -2 | 0 |
| 13 | 13 | 4 | 0 | -19 | -7 | 15 |

Fig. 14j

MRA PROCESSING WITH RESPECT TO x DIRECTION

| 719 | 81 | -4 | 69 | -45 | 22 | 13 |
|-----|----|----|----|-----|----|----|
| 694 | 75 | -2 | 63 | -19 | 4  | 7  |
| 18  | 0  | -7 | 16 | -35 | 5  | 17 |
| 0   | 8  | 5  | -6 | 0   | 0  | 0  |
| -6  | -2 | -8 | 0  | 7   | -3 | -4 |
| 0   | 3  | 0  | 0  | 0   | -2 | 0  |
| 13  | 13 | 4  | 0  | -19 | -7 | 15 |

Fig. 14k

MRA PROCESSING WITH RESPECT TO y DIRECTION (TRANSFORMED DATA)

| 999 | 110 | -4 | 69 | -45 | 22 | 13 |
|-----|-----|----|----|-----|----|----|
| 18  | 4   | -2 | 63 | -19 | 4  | 7  |
| 18  | 0   | -7 | 16 | -35 | 5  | 17 |
| 0   | 8   | 5  | -6 | 0   | 0  | 0  |
| -6  | -2  | -8 | 0  | 7   | -3 | -4 |
| 0   | 3   | 0  | 0  | 0   | -2 | 0  |
| 13  | 13  | 4  | 0  | -19 | -7 | 15 |

Fig. 14ℓ

DATA AFTER REDUCTION PROCESSING

| 999 | 110 | 0 | 69 | -45 | 22 | 0 |
|-----|-----|---|----|-----|----|----|
| 18  | 0   | 0 | 63 | -19 | 0  | 0 |
| 18  | 0   | 0 | 0  | -35 | 0  | 0 |
| 0   | 0   | 0 | 0  | 0   | 0  | 0 |
| 0   | 0   | 0 | 0  | 0   | 0  | 0 |
| 0   | 0   | 0 | 0  | 0   | 0  | 0 |
| 0   | 0   | 0 | 0  | -19 | 0  | 0 |

Fig. 14m

RESTORED DATA (5×6 PIXELS)

| 87 | 104 | 135 | 152 | 127 |
|----|-----|-----|-----|-----|
| 95 | 102 | 125 | 151 | 123 |
| 90 | 107 | 133 | 156 | 128 |
| 88 | 110 | 136 | 160 | 132 |
| 66 | 116 | 144 | 156 | 134 |
| 82 | 103 | 151 | 153 | 132 |

Fig. 15a

ORIGINAL IMAGE (5×6 PIXELS)

| 89 | 101 | 130 | 146 | 123 |
|----|-----|-----|-----|-----|
| 93 | 103 | 129 | 144 | 131 |
| 91 | 110 | 132 | 149 | 135 |
| 88 | 109 | 138 | 151 | 140 |
| 73 | 129 | 144 | 159 | 160 |
| 75 | 100 | 158 | 161 | 130 |

Fig. 15b

EXTENSION

| 89 | 101 | 130 | 146 | 123 | 0 | 0 | 0 |
|----|-----|-----|-----|-----|---|---|---|
| 93 | 103 | 129 | 144 | 131 | 0 | 0 | 0 |
| 91 | 110 | 132 | 149 | 135 | 0 | 0 | 0 |
| 88 | 109 | 138 | 151 | 140 | 0 | 0 | 0 |
| 73 | 129 | 144 | 159 | 160 | 0 | 0 | 0 |
| 75 | 100 | 158 | 161 | 130 | 0 | 0 | 0 |
| 0  | 0   | 0   | 0   | 0   | 0 | 0 | 0 |
| 0  | 0   | 0   | 0   | 0   | 0 | 0 | 0 |

Fig.15c

INTERPOLATION

| 89 | 101 | 130 | 146 | 123 | 115 | 106 | 98 |
|---|---|---|---|---|---|---|---|
| 93 | 103 | 129 | 144 | 131 | 122 | 112 | 103 |
| 91 | 110 | 132 | 149 | 135 | 124 | 113 | 102 |
| 88 | 109 | 138 | 151 | 140 | 127 | 114 | 101 |
| 73 | 129 | 144 | 159 | 160 | 138 | 117 | 95 |
| 75 | 100 | 158 | 161 | 130 | 116 | 103 | 89 |
| 80 | 100 | 149 | 156 | 128 | 116 | 104 | 92 |
| 84 | 101 | 139 | 151 | 125 | 115 | 105 | 95 |

Fig.15d

DATA AFTER TRANSFORM PROCESSING

| 944 | 108 | -51 | 88 | -18 | 17 | -3 | 0 |
|---|---|---|---|---|---|---|---|
| 17 | 15 | -25 | 68 | -13 | 4 | 1 | 0 |
| -8 | -6 | 0 | 13 | -26 | 5 | 8 | 0 |
| 8 | 10 | 5 | -7 | -35 | 24 | 2 | 0 |
| -1 | 0 | -3 | -5 | 1 | -2 | -1 | 0 |
| 1 | 3 | 0 | 0 | 0 | -2 | 0 | 0 |
| 0 | 13 | 3 | 25 | -16 | -7 | 11 | 0 |
| 0 | -2 | 2 | -3 | 2 | 3 | -1 | 0 |

Fig.15e

DATA AFTER REDUCTION PROCESSING

| 944 | 108 | -51 | 88 | 0 | 0 | 0 | 0 |
|---|---|---|---|---|---|---|---|
| 0 | 0 | -25 | 68 | 0 | 0 | 0 | 0 |
| 0 | 0 | 0 | 0 | -26 | 0 | 0 | 0 |
| 0 | 0 | 0 | 0 | -35 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig.15f

RESTORED DATA (5×6 PIXELS)

| 100 | 98  | 130 | 152 | 132 |
|-----|-----|-----|-----|-----|
| 100 | 96  | 128 | 150 | 132 |
| 89  | 106 | 132 | 156 | 133 |
| 81  | 112 | 135 | 159 | 133 |
| 80  | 114 | 136 | 161 | 134 |
| 77  | 117 | 137 | 163 | 134 |

Fig.16

|  | PRIOR ART | FIRST EMBODIMENT | SECOND EMBODIMENT |
|---|---|---|---|
| read (SEC) (COMPRESSION/RESTORATION) | 0.56/0.46 | 0.23/0.14 | 0.25/0.15 |
| WT (SEC) (COMPRESSION/RESTORATION) | 0.99/1.01 | 0.37/0.36 | 0.38/0.38 |
| write (SEC) (COMPRESSION/RESTORATION) | 0.39/0.08 | 0.19/0.07 | 0.20/0.07 |
| total (SEC) (COMPRESSION/RESTORATION) | 1.94/1.55 | 0.79/0.57 | 0.83/0.60 |
| FILE SIZE (bytes/bpp) | 3034/0.984 | 1378/0.447 | 1189/0.386 |

APPARATUS FOR COMPRESSING AND RESTORING IMAGE DATA USING WAVELET TRANSFORM

BACKGROUND OF THE INVENTION

1. Field of the Invention

This invention relates to an art of transforming image data using a Wavelet transform, and more particularly to an apparatus for compressing image which compresses any size of image data using a Wavelet transform as well as about an apparatus for restoring image which restores the image data compressed by that image compressing apparatus.

2. Description of the Related Art

In recent years, with growing diffusion of computers and communication networks, opportunities for collecting, sending and receiving a large quantity of image data have been increasing. With that reason, the technology of efficient compressing image data has been demanded.

Images to be subject of this invention include many things from human figure images, landscape pictures, computer graphics to medical data, weather data and astronomical observation data.

With image compressing systems like JPEG, the images have been divided into small block units to be processed by the block unit, assigned zero to the fractions.

When a Wavelet transform system is used, however, the whole image is collectively transformed since the computation efficiency will be rather drooped by dividing into the blocks. In that case, one side length of the subject image must be only an exponentiation of 2, allowing only using images with the 64×64, 256×256 pixels, etc. before.

There are the literature cited for the Wavelet transform as follows;

I. Daubechies "Ten lectures on Wavelets" 1992 SIAM (Society for Industrial and Applied Mathematics).

W. H. Press et. al "Numeral Recipes (Second Edition)" 1992 Cambridge University Press pp. 584–599.

FIG. 1a–FIG. 1c describe the compression processing using a Wavelet transform. To make it simple, the original image size will be described as 8×8 pixels (cf. the FIG. 1a) and to x and y directions, 3 octaves of multiple resolution analysis which will be described later will be conducted.

In the Wavelet transform, the frequency components will be divided into low region components and high region components for each horizontal and vertical directions. With it, the image data will be transformed as follows; information of low region components of horizontal direction and low region components of vertical direction in the up left of the image, information of high region components of horizontal direction and low region components of vertical direction in the up right, information of low region components of horizontal direction and high region components of vertical direction in the down left, information of high region components of horizontal direction and high region components of vertical direction in the down right. One transforming makes one octave of the resolution down.

Then, divide the part of low region components of horizontal direction and low region components of vertical direction in the up left of the image into the low region components and high region components of frequency in the same way. Repeat this several times.

Generally, in the image data, the information is concentrated in the low region components. Therefore, in the high region components, data reduction to some extent will not make much deterioration of the image by restoration. The Wavelet transform, which is a kind of orthogonal transform like DCT, has a merit that it has relatively less noise especially when the high region is transformed.

FIG. 1b describes the data after transform processing (multiple resolution analyzing processing). It shows that the low frequency components and high frequency components regions are lined up from the left to the right of x direction and from the up to the down of y direction of the transformed data, respectively. From this transformed data, it is clear that the closer the up left low frequency component region, the more the image data information is concentrated. When the data is reduced, use predetermined threshold value to make the data which is smaller than the threshold zero.

FIG. 1c shows the data after reduction processing. With it, the high frequency components region, which has low concentration of the information, will be efficiently reduced and then the efficient compressed data can be generated by compressing with encoding entropy, etc.

Restoration processing is conducted by inverse steps of the compression processing, which is, by decoding entropy and inverse Wavelet transforming to generate the restored data. FIG. 2 shows the data generated by the restoration processing.

As described above, when a Wavelet transform was used, one side length of the subject image must have been only an exponentiation of 2. If it was not an exponentiation of 2, the Wavelet transform should have been done after it had been extended to exponentiation of 2.

FIG. 3a and 3b describe extension processing of the prior Wavelet transform. In the prior Wavelet transform, only predetermined sized original image could be transformed. In case the size was 137×180 as shown in FIG. 3a, it was enlarged to the size $2^8 \times 2^8 = 256 \times 256$ as shown in FIG. 3b and was transformed, using the extended image with zero value assigned to the enlarged area.

The multiple resolution analysis of a Wavelet transform is conducted as follows; Firstly, take out one line of x direction, then let brightness of the kth of the 256 pixels $Ck^{(0)}$. The value in the bracket of $Ck^{(0)}$ describes the transforming level. One octave down makes the value −1.

Next, following the resolving algorithm, obtain 128 low resolution components $Cn^{(-1)}$ and 128 Wavelet components $dn^{(-1)}$ using the following (expression 1) and (expression 2).

$$c_n^{(-1)} = (\tfrac{1}{2})\Sigma_k p_{k-n} c_k^{(0)} \quad \text{(expression 1)}$$

$$d_n^{(-1)} = (\tfrac{1}{2})\Sigma_k q_{k-2n} c_k^{(0)} \quad \text{(expression 2)}$$

$\Sigma_k$ indicates the sum total from k=0 to 255. Also, $p_k$ and $q_k$ are coefficients of two scale functions; a scaling function $\phi(x)$ and a Wavelet function $\psi(x)$, respectively.

$$\phi(x) = \Sigma p_k \phi(2x-k) \quad \text{(expression 3)}$$

$$\psi(x) = \Sigma q_k \phi(2x-k) \quad \text{(expression 4)}$$

However, $\Sigma$ indicates the sum total from k=0 to m (support length of a function: length of the area which function value is not zero.)

After finishing the above resolution to all the x direction lines, conduct the same to all the y direction rows as well. As a result, the low resolution components will be gathered in the 128×128 area.

Next, again, conduct the same to the 128×128 area to get low resolution component of 64×64. Repeat this until it gets the predetermined resolution. Normally around 4 times would be enough.

Generally, in compression using transforming, the higher the compressibility ratio is, the lower the quality of the restored image. In case of JPEG, it has guaranteed the quality of image with establishing "Quality Parameter".

This method, however, is not accurate since it reduces the data by adjusting the divided value with an integer. In this case, the signal-to-noise ratio was calculated after output of the restored image, compared with the original image.

As stated above, the image compression by a Wavelet transform for any sized image has not been studied till now in spite of its necessity as a practical matter. Processing process must be simple with the method of assigning zero value to the extended area by extending the image frame like existing JPEG system. However, the computing time and the amount of memory needed will be increased with the increasing amount of the assigned zero. If things come to the worst, four times of the amount of original memory would be needed.

Also, it took a long time to check the restored image quality since it had to compare the original image and restored image after restoring the image.

SUMMARY OF THE INVENTION

The main purpose of this invention is to create an apparatus which efficiently compresses and restores images which makes it possible to minimize zero area mentioned above to reduce the computing time and the amount of memory needed.

Also, another purpose of this invention is to create an apparatus which is able to estimate the signal-to-noise ratio when the data is reduced.

To attain the above objects, according to one aspect of the present invention, there is provided an image compressing apparatus having a Wavelet transforming unit for compressing digitized image data using a Wavelet transform, said Wavelet transforming unit comprising:

a means which extends image data area to make the number of data of the subject of transforming of horizontal and vertical directions even, with every one octave of resolution down when a Wavelet transform is conducted hierarchically based on multiple resolution analysis and another means which interpolates values in extended image data area using data in image data area before extension to conduct a Wavelet transform on data of that interpolated image data area.

Also, according to another aspect of the present invention, there is provided an image restoring apparatus having an inverse Wavelet transforming unit for restoring image data compressed by a Wavelet transform, said inverse Wavelet transforming unit comprising a means which reduces redundancy generated by extension of image data area caused by image data compression when the image data is restored with every one octave of resolution up.

Also, according to still another aspect of the present invention, there is provided an apparatus for transforming image data using a Wavelet transform, comprising an image compressing apparatus having a Wavelet transforming unit for compressing digitized image data and an image restoring apparatus having an inverse Wavelet transforming unit for restoring image data compressed by said image compressing apparatus, said Wavelet transforming unit in the image compressing apparatus comprising a means which extends image data area to make the number of transforming subject data of horizontal and vertical directions even, with every one octave of resolution down when a Wavelet transform is conducted hierarchically based on multiple resolution analysis to conduct a Wavelet transform on data of that interpolated image data area and the Wavelet transforming unit mentioned above in the image restoring apparatus also mentioned above have a means which reduces redundancy generated by extension of image data area caused by image data compression when the image data is restored with every one octave of resolution up.

BRIEF DESCRIPTION OF THE DRAWINGS

Other objects and features of the present invention will be described hereinafter in detail by way of preferred embodiments with reference to the accompanying drawings, in which;

FIG. 1a–FIG. 1c describe the compressing process using the Wavelet transform;

FIG. 2 shows one example of the restored data generated by a Wavelet transform;

FIG. 4 is a block diagram which shows the principal structure of the image data transforming apparatus using a Wavelet transform on this invention;

FIG. 6 shows one example of a Wavelet function;

FIG. 8 is a flowchart which shows a Wavelet transform, following the first embodiment of this invention;

FIG. 11 is a flowchart which shows one example of the data reducing process;

FIG. 12 is a block diagram which shows one example of the structure of Wavelet image compression apparatus described in FIG. 4;

FIG. 13a–FIG. 13f describes a Wavelet image transforming process of prior technology (zero assigning method);

FIG. 14a–FIG. 14m describe a Wavelet image transforming process, following the first embodiment of this invention;

FIG. 15a–FIG. 15f describe the Wavelet image transforming process, following the second embodiment of this invention;

FIG. 16 shows the time required for computation and the compressibility ratio based on each embodiment of this invention compared with the prior art (zero assigning method).

DESCRIPTION OF THE PREFERRED EMBODIMENTS

Figure 3A:
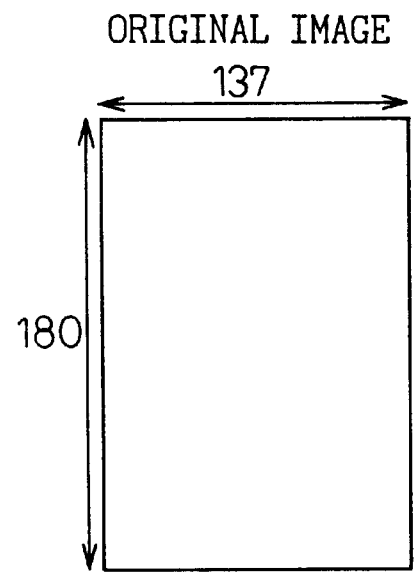
FIG. 3a and FIG. 3b describe the extending process of the prior Wavelet transform technology.
Figure 3B:
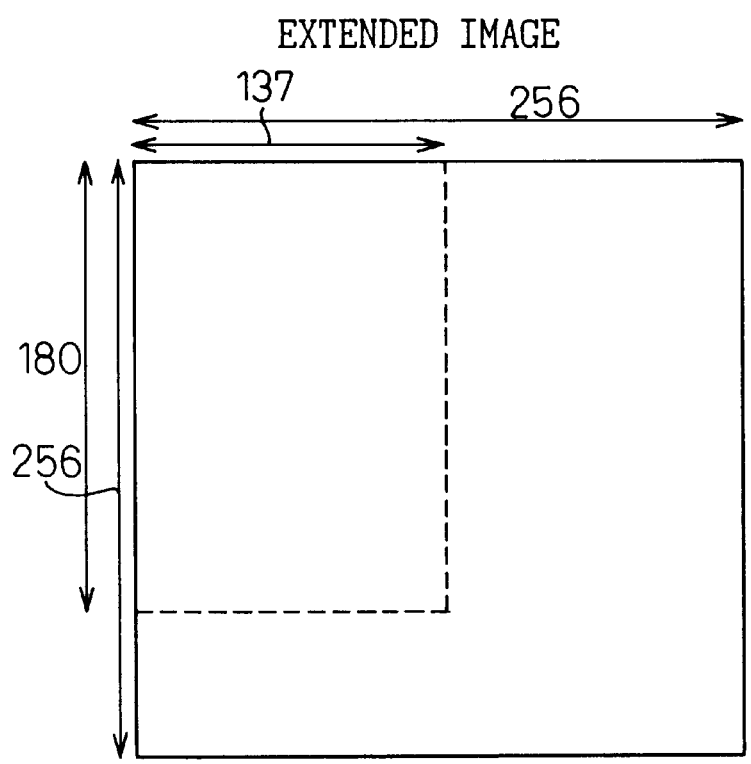

FIG. 4 describes the principal of this invention.

The Wavelet image compressing apparatus 1 is consisted of the Wavelet transforming unit 11 which includes the size adjusting unit 12, the numbering processing unit 13, the data reduction processing unit 14 and the entropy coding unit 15. The Wavelet image compressing apparatus 2 is consisted of the entropy decoding unit 21, the numbering restoration processing unit 22, the inverse Wavelet transforming unit 23, having the inverse size adjusting unit 24 and the restored image display processing unit 25.

The original image data 3 is an image data to be the subject of compression. The input parameter 4 is a parameter used for image compressing control of the original image size, the function discrimination number used for a Wavelet transform and image quality threshold values. The compressed data 5 is data which is consisted of image data compressed by the Wavelet image compressing apparatus 1 and values required for the restoration.

The Wavelet transforming unit 11 conducts a Wavelet transform hierarchically based on the multiple resolution analysis.

The size adjusting unit 12 adjusts size of the original image data 3 to the suitable size for a Wavelet transform. In case there are many hierarchies in the multiple resolution analysis or the number of hierarchy is not fixed, for example, the size adjusting unit 12 checks the number of data of the subject of transforming whether it is an odd or even number, with every one octave of the resolution down. If the number is odd, it extends the image data area to make it even number and interpolates the value of extended image data area with data of the image data area before the extension.

Or, in case the number of hierarchy in the multiple resolution analysis is small or that number is fixed in advance, it extends the image data area to make the number of data of the subject of transforming even, only for the number of the hierarchy. Then it interpolates the value of extended image data area with data of the image data area before the extension.

The Wavelet transforming unit 11 conducts a Wavelet transform for the data in the image data area extended and interpolated as above.

The numbering processing unit 13 is a unit which assigns numbers to the resolution; the lower the resolution is, the smaller the number is. The data reduction processing unit 14 is a unit which sorts the transformed values according to descending order of amplitude value and reduces data sequentially in ascending order of amplitude value, estimating the quality of restored image quantitatively. The entropy coding unit 15 is a unit which compresses data by entropy coding and generates the compressed data 5.

The entropy decoding unit 21 of the Wavelet image restoring apparatus 2 is a unit which entropy decodes the compressed data 5 using inverse transforming of coding process of the entropy coding unit 15. The numbering restoration processing unit 22 is a unit which reassign numbers given by the numbering processing unit 13 to data which restored by the entropy decoding unit 21 and restores the original list.

The inverse Wavelet transforming unit 23 is a unit which generates restored data using inverse transforming of transforming process at the Wavelet transforming unit 11.

The inverse size adjusting unit 24 conducts process which omits redundancy generated by extending process of the size adjusting unit 12 with every one octave up by the inverse Wavelet transforming unit 23. Or, it conducts process which omits redundancy generated by extending process of the size adjusting unit 12 when multiple resolution analysis by the inverse Wavelet transforming unit 23 is terminated.

The restored image display processing unit 25 is a unit which displays images based on restored data obtained from the inverse Wavelet transforming unit 23.

The Wavelet image compressing apparatus 1 takes optional sized original image data 3, adjusts the original image size to suitable size for transforming, following provided input parameter 4 to conduct a Wavelet transform and generates the compressed data 5 through numbering process, data reducing process and entropy coding. The Wavelet image restoring apparatus 2 conducts entropy decoding and numbering restoring process from the compressed data 5 when required, omits redundancy which is the area extended by size adjustment at compressing process and obtains the restored image through the inverse Wavelet transforming process.

Consequently, it is possible to transform any provided sized image to the compressed data all at once and restore them to obtain the restored image when required. Also, the smaller the extended size is, the smaller the amount of computation time and the memory needed, which makes it possible to conduct efficient transforming by size adjustment. Furthermore, the compressibility ratio will be improved with the smaller data distribution.

The data reduction processing unit 14 reduces data from the one with smaller amplitude within the range that the signal-to-noise ratio is not exceeded the threshold value. Here the data is almost listed in the ascending order of amplitude values by the numbering processing unit 13 to improve the compressibility ratio with the reduced data with smaller numbers.

Embodiments of this invention will be described hereinafter with the figures.

Figure 5:
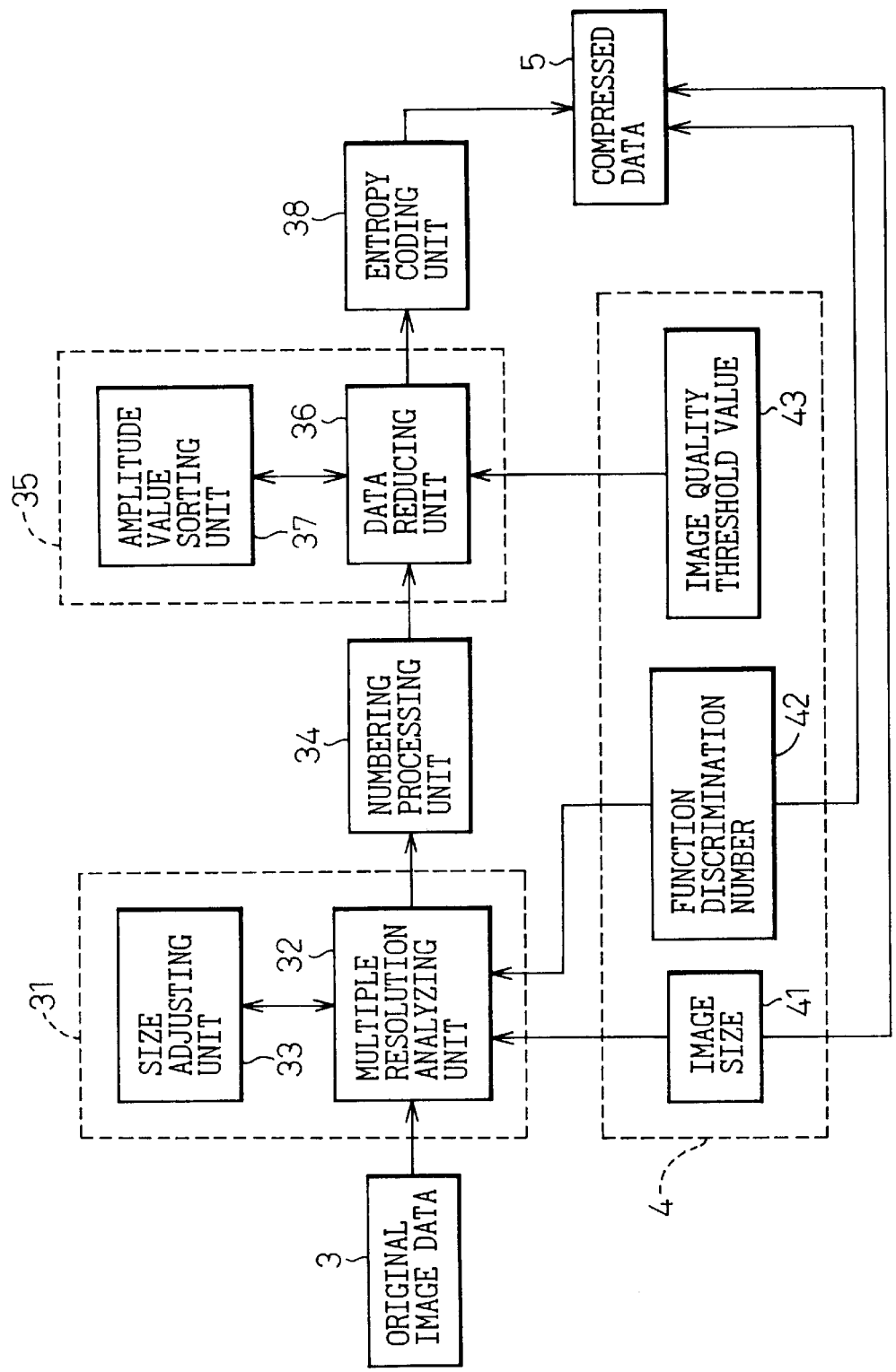
FIG. 5 is a block diagram which shows one example of the structure of Wavelet image compressing apparatus described in FIG. 4.

FIG. 5 shows a structure example of the Wavelet image compressing apparatus.

The multiple resolution analyzing unit 32 in the Wavelet transforming unit 31 conducts multiple resolution analysis, using the image size 41 and the function discrimination number obtained by the input parameter 4. As for a Wavelet function, normal orthogonal function is desirable rather than biorthogonal function. FIG. 6 shows some examples of usable functions. These functions are determined to indicate $p_k$ and $q_k$ value in FIG. 6 on the said expressions (expression 1 and 2). There are three functions and each one of them can be used.

The size adjusting unit 33 adjusts size of the original image data 3 to suitable image size for a Wavelet transform. There are two ways for the size adjusting process. The first adjusting method and the second adjustment method are described as the first embodiment and the second embodiment, respectively as follows;

The First Embodiment

The first embodiment is an effective way in case the number of hierarchy in the multiple resolution analysis is large or the number of hierarchy is not determined. With the first embodiment, the area size of image data of the subject of transforming will be extended to make it even number and the size adjusting process will be conducted to interpolate the extended data points. In other words, when the number of data (pixels) of one side of data which will be conducted resolution analysis is odd, data points will be extended only one row or line to be interpolated to be assigned average values at both ends of original row of data.

FIG. 7a–FIG. 7j describe the Wavelet transforming process using the first embodiment.

Figure 7A:
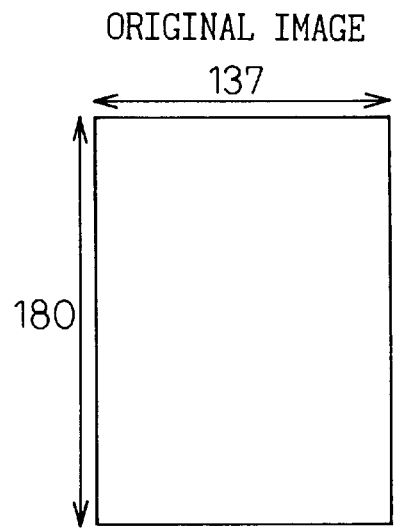
FIG. 7a–FIG. 7j describe a Wavelet transform, following the first embodiment of this invention.

As shown in FIG. 7a, if an original image of the subject of transforming is 137×180 size, the number of data of x direction is odd. In this case, data point will be extended one row and the average data value of the first and the 137th row from the left will be assigned to the 138th line which is the extended one. Since the number of data of y direction here is even, extension will not be needed. Then resolution analysis will be conducted to x direction followed by another resolution analyzing to y direction conducted on that result. The area $L_{0a}$ where the low resolution components are concentrated and the Wavelet components will be obtained.

Figure 7B:
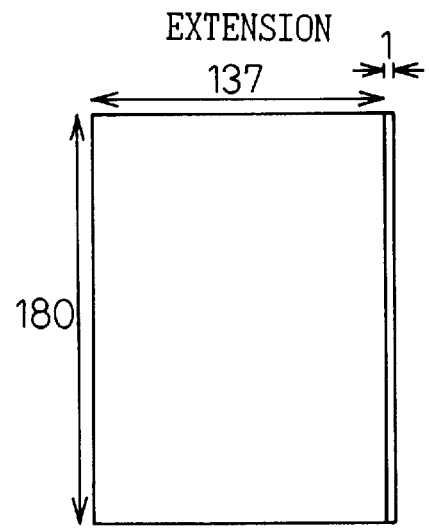
Figure 7C:
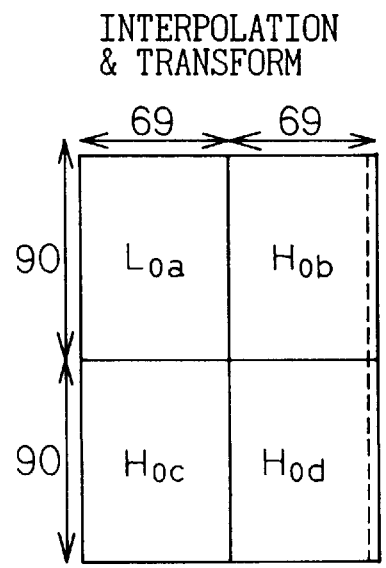
Figure 7D:
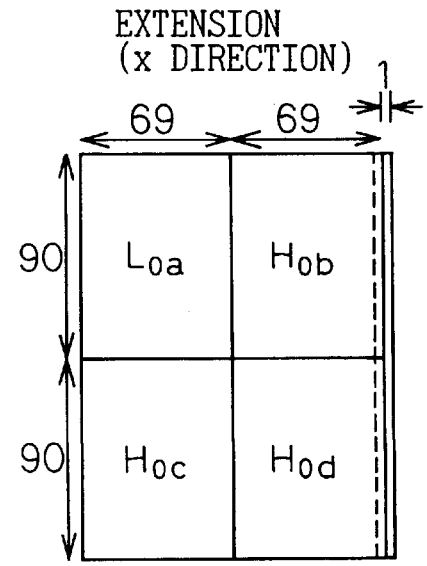

FIG. 7c shows condition after the first resolution analyzing. $L_{0a}$ is an area where the low resolution components of x and y direction are concentrated, $H_{0b}$ is an area of the high resolution component with x direction and the low resolution component with y direction, $H_{0c}$ is an area of the low resolution component with x direction and the high resolution component with y direction, and $H_{0d}$ is an area where the high resolution components of x and y direction are concentrated.

Next, the second resolution analyzing will be conducted on the area $L_{0a}$. Since the number of data to x direction is odd, data point will be extended again one row as shown in FIG. 7b. That extended data row will be shifted the 70th lateral row in the $L_{0a}$ area to be interpolated. In other words, average value of the first and 69th line values will be assigned to the shifted 70th row.

Figure 7E:
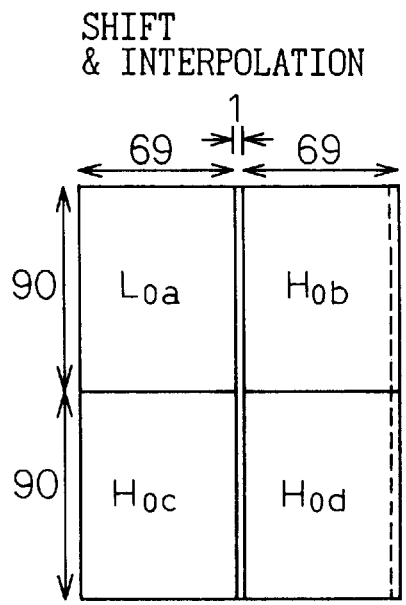
Figure 7F:
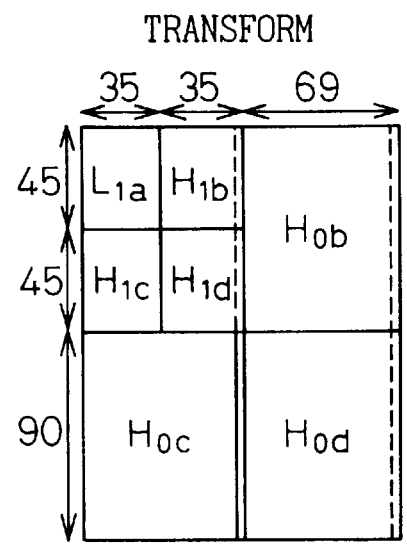

FIG. 7e shows an image data area after shifting and interpolating. The $L_{0a}$ area size becomes 70×90 at this time and another Wavelet transform will be conducted on this $L_{0a}$ area. The transformed data areas will be $L_{1a}$, $H_{1b}$, $H_{1c}$, $H_{1d}$ (cf. FIG. 7f).

Figure 7G:
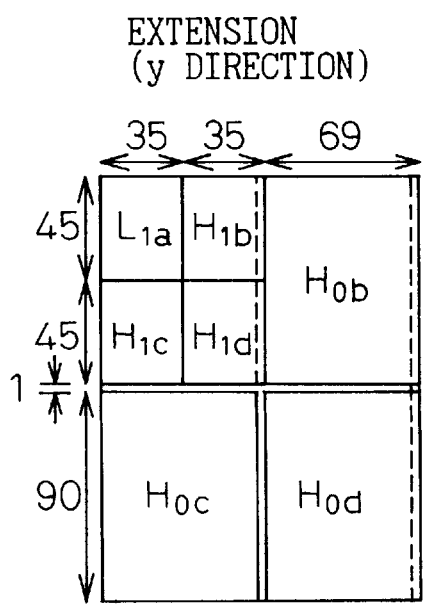
Figure 7H:
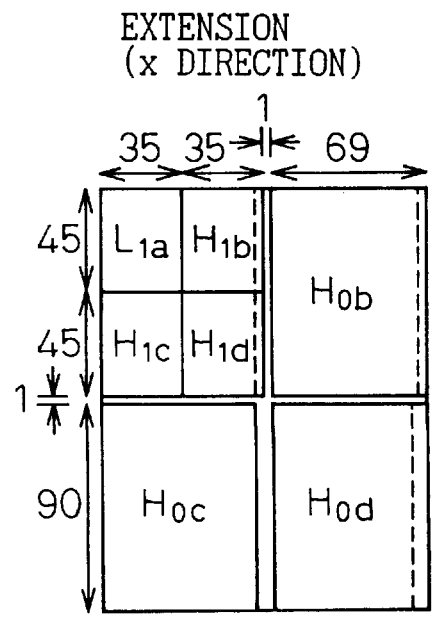
Figure 7I:
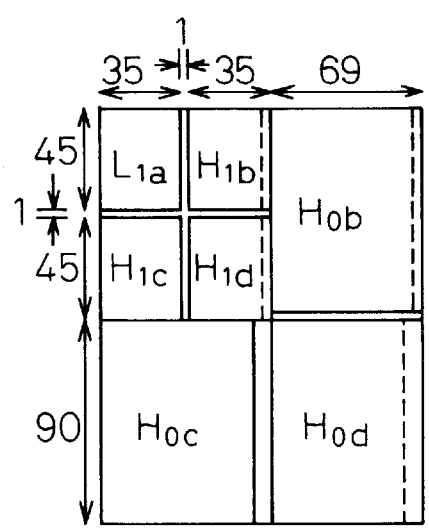
Figure 7J:
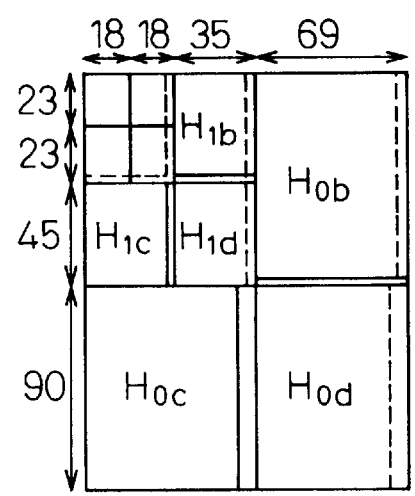

Then the area $L_{1a}$ will be transformed. Since the $L_{1a}$ area size is 35×45 and the number of data to both x and y directions is odd, data point will be extended one line to y direction as shown in FIG. 7g. Also data point will be extend one row to x direction. Then the extended data line and row will be shifted to interpolate the value. With it, the $L_{1a}$ area will be 36×46 size, which makes it possible to be transformed again.

FIG. 8 shows a flowchart of the Wavelet transforming process on the first embodiment.

Step S1 judges the number of data of x direction whether it is odd or not. If the number of data is odd, go to Step S2 to be processed, or in case the number is even, go to Step 3.

Step S2 extends the size and interpolates it by adding average values at both ends to the end of row of data.

Step S3 analyzes resolution of x direction.

Step S4 judges the number of data of y direction whether it is odd or not. If the number of data is odd, go to Step S5 to be processed, or in case the number is even, go to Step 6.

Step S5 extends the size and interpolates by adding average values at both ends to the end of row of data.

Step S6 analyzes resolution of x direction.

Step S7 judges the resolution whether it is a predetermined one or not. If it is, the process will be terminated. If it is not, go back to Step S1 to repeat analyzing resolution in the same way.

The Second Embodiment

The second embodiment is an effective way in case the number of hierarchy in the multiple resolution analysis is small. With the second embodiment, the size of original image data 3 will be extended to make only the predetermined number of hierarchy even number and the size adjusting process will be conducted to interpolate the extended data points. In other words, when the number of data point of one side of the original image data 3 is a, and b hierarchies (the number of hierarchy) will be transformed, It finds the minimum value within x which makes $x/2^b$ integer ($x \geq a$) to extend and interpolate the image area to make it x line or x row in advance.

Figure 9A:
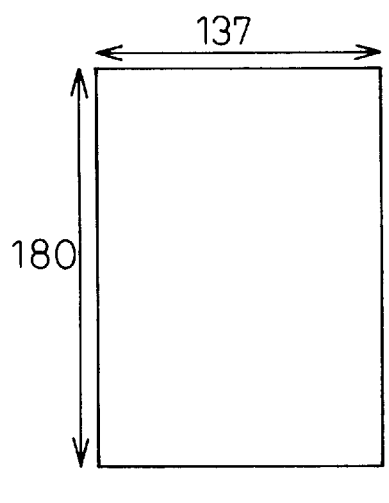
FIG. 9a–FIG. 9d describe a Wavelet transform, following the second embodiment of this invention.
Figure 9B:
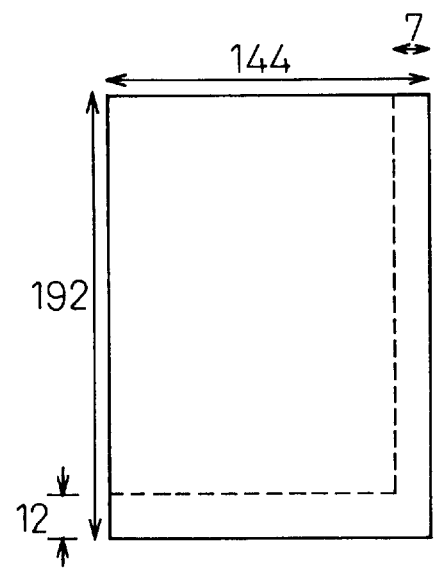

FIG. 9a–FIG. 9b describe the Wavelet transforming process using the second embodiment.

As shown in FIG. 9a, an original image of the subject of transforming is 137×180 size and determined to analyze resolution up to 4 octaves. In other words, analyze resolution 4 times. In this case, find the minimum value which makes the size of x and y directions even, with the 4 times process. In this example, the x direction should be 144 and the y direction should be 192, since $144 \div 2^4 = 9$ (integer) and $192 \div 2^4 = 12$ (integer).

Figure 9C:
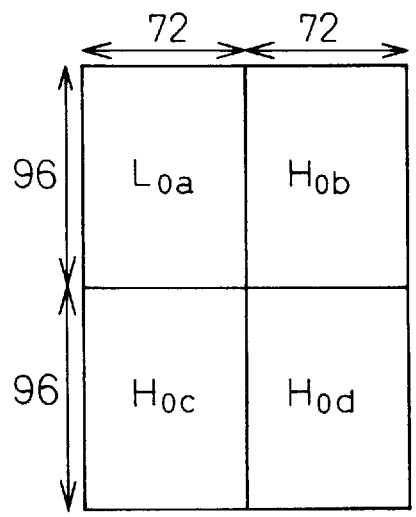

Consequently, 7 rows data points to the x direction and 12 lines data points to the y direction will be extended to interpolate data in the extended area. The interpolation will be conducted by assigning values from both ends of the image to the extended area. Then the extended and interpolated area will be transformed. FIG. 9c shows condition after the first resolution analyzing. As described in FIG. 7a–FIG. 7j, the areas will be $L_{0a}$, $H_{0b}$, $H_{0c}$, $H_{0d}$.

Figure 9D:
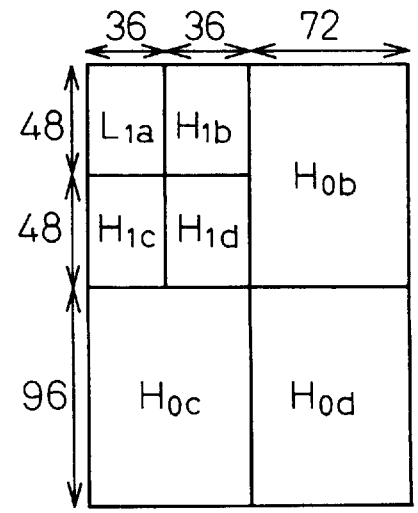

FIG. 9d shows area after the second resolution analyzing. The third resolution analyzing will be conducted to the $L_{1a}$ area, followed by the 4th resolution analyzing to $L_{2a}$ area generated by the third resolution analysis.

For the data obtained by a Wavelet transform described as the first or the second embodiment as above, data compression will be conducted as follows.

Figure 10A:
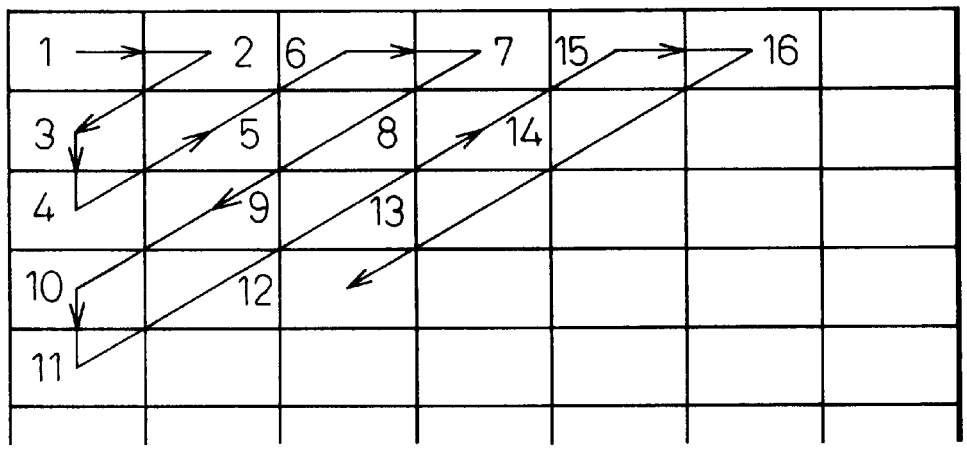
FIG. 10a and FIG. 10b show one example of numbering processing.
Figure 10B:
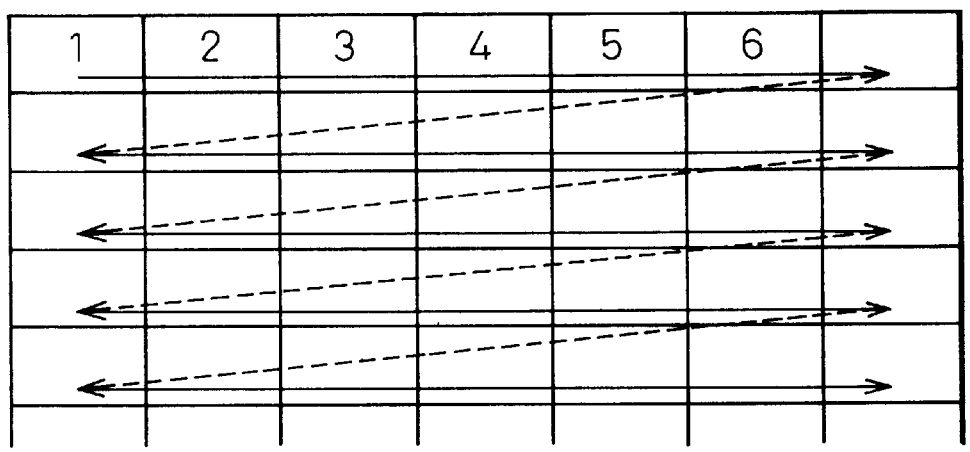

The numbering processing unit 34 assigns numbers; the lower the resolution of transformed value, the smaller the number is. This process assigns numbers for changing order of data to reduce and compress data efficiently. The numbering method may be, for example, assigning numbers to lines and rows reciprocally as shown in FIG. 10a, or assigning numbers by scanning to the direction of lines or rows from the lower resolution area as shown in FIG. 10b.

The amplitude value sorting unit 37 in the data reduction processing unit 35 sorts transformed values obtained by the Wavelet transforming unit 31 according to descending order of amplitude vale. This is a preparation for reducing data in ascending order of amplitude value and it is sorted as a set of assigned number before the sorting and the transformed value.

The data reducing unit 36 reduces data in ascending order of amplitude value. At that time, it reduces within a range which keeps a certain image quality, estimating the restored image by the transformed value sorted by the amplitude vale sorting unit 37, using the image quality threshold value.

If a normal orthogonal function is used as a Wavelet function, calculate the sum of a square of the amplitude value of data which will be reduced and if that value exceeds a certain value, terminate the data reduction.

FIG. 11 is a flowchart of the data reducing process.

Step S11 sorts transformed values according to descending order of amplitude value.

Step S12 initializes a integrated value X to zero.

Step S13 makes transformed value whose amplitude value is not zero and which has the smallest value "Y" and make its number "I".

Step S14 conducts $X = X + Y^2$ which integrates the sum of a square of the amplitude value of data which will be reduced.

Step S15 judges whether X exceeds a certain threshold value or not. If X is more than the threshold value, it terminates the data reduction and if X is less than the threshold value, it conducts Step S16 process.

Step S16 reduces data, making i-th transformed value zero. Then go back to Step S13 to repeat the process until X will exceed the threshold value.

Threshold value used in Step S15 will be determined by the principle as follows;

Firstly, signal-to-noise ratio of restored image can be obtained from the integrated value X of a square of amplitude value with an expression (expression 5) as follows;

$$10 \log^{10}(ND^2/X) \qquad \text{(expression 5)}$$

The unit here is dB (decibel), N is the number of pixel and D is the number of gradient of brightness. The quality of image will be guaranteed unless this value is less than a certain value Z.

As for Z value, 30 dB is generally selected. When it is actually calculated, for reducing the number of operation times, (expression 6) which counts backward from (expression 5) will be used as follows;

$$X > ND^2 10^{-Z/10} \qquad \text{(expression 6)}$$

If this right side is calculated only once, data reduction can be conducted within a range which satisfies the (expression 6). Therefore, the right side of this (expression 6) is used as a threshold value of Step S15. Also, Z can be provided from outside as the image quality threshold value 43 of the input parameter 4.

Effects of extending and interpolating image area is too small to consider, however, when it is taken into account, the sum of a square of data interpolated from integrated value X should be deducted in advance.

The entropy coding unit 38 encodes reduced data. As for the entropy coding method, any of the coding as Huffman coding, arithmetic coding or LZW method can be used. Those coding methods are well known and each detail will be omitted.

When the compressed data 5 is retained, the original data size and the kind of used Wavelet function should be also retained with the image data itself.

FIG. 12 shows one structure example of the Wavelet image restoring apparatus.

To generate restored image from the compressed data 5, conduct the process described with the structure example of the Wavelet image compressing apparatus in FIG. 4 in totally inverse order. The compressed data 5 will be transformed in inverse order of entropy coding by the entropy decoding unit 51. The numbering restoration processing unit 52 assigns numbers by inverse order of the numbering process shown in FIG. 10a and FIG. 10b for data restored by the entropy decoding unit 51 to restore the listing order.

The inverse Wavelet transforming unit 53 conducts inverse transforming of that of the Wavelet transforming unit 31 in FIG. 5, using the multiple resolution analyzing unit to restore images. On this occasion, it omits the redundant part extended by the size adjusting unit 33 in FIG. 5, using the inverse size adjusting unit 55 with every hierarchy or when all the multiple resolution analyzing is terminated. It also displays the restored image on display apparatus using the restored image display processing unit 56 when required.

A expression used for inverse transformation in the inverse Wavelet transforming unit 53 is (expression 7) as follows;

$$c_k^{(0)} = \Sigma_n p_{k-2n} c_n^{(-1)} + q_{k-2n} d_n^{(-1)} \qquad \text{(expression 7)}$$

$\Sigma_n$ shows the sum total from n=0 to N (N is the number of pixels in one side). Also, $p_k$ and $q_k$ are coefficients of two scale function of a scaling function $\phi(x)$ and a Wavelet function $\psi(x)$, respectively (cf. expression 3 and expression 4).

Next, the first embodiment of the case which extends/interpolates an original image of 5×6 pixels with every multiple resolution analysis (the first embodiment) and the second embodiment of the case which extends/interpolates at a time when 3-octave resolution analyzing is conducted to an original image of 5×6 pixels (the second embodiment) will be described.

Wavelet transform using "Daubechies N=22", which is one of the functions shown in FIG. 6, as a Wavelet function was conducted. As for data reduction processing, it was set that the restored image was about 30 dB. As for entropy coding method, "LZ 77" was used.

Firstly, to clarify the difference between this invention's embodiments and the prior art, the process of compressing and restoring image data by zero assigning method which is the prior art will be described here.

FIG. 13a–FIG. 13f describe the prior art (zero assigning method).

As shown in FIG. 13a, if an original image of the subject of process is 5×6 pixels, extend the area to 8×8 pixels to make one side length an exponentiation of 2.

Then, conduct transforming process (cf. FIG. 13c) and data reducing process (cf. FIG. 13d) to generate the compressed data. If this compressed data is restored by inverse Wavelet transforming, 8×8 sized image data will be obtained as shown in FIG. 13e. Assign zero and omit generated extension area to obtain the restored image with the original image size, 5×6. FIG. 13f shows the restored image with the original image size.

Next, the first embodiment which extends/interpolates with every multiple resolution analysis (MRA) will be described, using FIG. 14a–FIG. 14m.

FIG. 14a shows an original image of 5×6 pixels. Since the number of pixel in x direction is odd, extension and interpolation to x direction will be conducted as shown in FIG. 14b. For example, the interpolated value "106", which is at the right end of the first line, is the average of the original values which are at the both ends of the first line, "89" and "123".

Since the number of pixel in y direction is even, extension will not be conducted. The number of pixel of the subject of transforming will be 6×6 by this extension. Multiple resolution analysis (MRA) to x direction will be conducted on it. Then, multiple resolution analysis to y direction will be conducted as shown in FIG. 14d.

Since the low resolution component area in FIG. 14d is 3×3, extend the lines and rows as shown in FIG. 14e and shift the extended zero area to the center to continue more multiple resolution analysis.

Then, interpolate the value of rows extended to x direction as shown in FIG. 14f to conduct multiple resolution analysis to x direction. The result will be shown as in FIG. 14g.

Then, interpolate also for y direction using shifted zero area to conduct multiple resolution analyzing as shown in FIG. 14h. Then repeat multiple resolution analysis to both x and y directions. FIG. 14k shows data after above transforming processes.

After that, data reduction will be conducted, estimating quality of image of the restored image quantitatively. FIG. 14l shows data after reduction processing. After data reduction processing, entropy coding will be conducted to generate the compressed data.

The restored data will be generated through a series of compressing process and inverse restoring process from the compressed data. FIG. 14m shows restored data (5×6 pixels) generated by restoring process of the compressed data shown in FIG. 14l.

Next, the second embodiment which conducts extension/interpolation of necessary amount at a time in the beginning, when 3-octave resolution analyzing will be conducted to an original image of 5×6 pixels.

FIG. 15a shows an original image of 5×6 pixels. Since the minimum size of image data which makes the number of pixel to be transformed by 3-octave resolution analyzing always even is 8×8, extend area for 3 pixels to x direction and 2 pixels to y direction. FIG. 15b shows an image data after the extension. The one side length in this example is an exponentiation of 2, however, it is not always an exponentiation of 2.

Then, interpolate the extended area as shown in FIG. 15c. An interpolated value is determined based on values at both ends of the same line or row. For example, interpolated values in the first line "115, 106, 98" are determined to be the average of the values at both ends of the original line. Multiple resolution analysis will be conducted on this interpolated 8×8 sized image data. FIG. 15d shows the image data after transform processing.

The data after reduction processing is shown in FIG. 15e. The compressed data will be generated on this by entropy coding.

The image will be restored based on this compressed data by the Wavelet image restoring apparatus 2. FIG. 15f shows the restored data generated by restoration processing (5×6 pixels).

FIG. 16 shows comparison of the time required for computation and compressibility ratio of the prior art (zero assigning method), the first embodiment and the second embodiment.

In "read" time, as for compression processing, it comprises the operation time for file reading and creating numbering corresponding table. As for restoration processing, it comprises the operation time for file reading, creating numbering corresponding table and entropy decoding. In "WT" time, as for compression processing, it is time for the Wavelet transform and as for restoration processing, it is the time for the inverse Wavelet transform. In "write" time, as for compression processing, it comprises the operation time for data reduction processing, entropy coding and file output. As for restoration processing, it is the time for the restored image data output.

As shown in FIG. 16, this invention has improved the time required for computation and the compressed file size 0.4 times and 0.5 times, respectively. The reason of the computation Lime reduction is because the necessary array is minimized. The reason of the compressibility ratio improvement is because the data distribution range is reduced by interpolation of the extended area.

When the results of first embodiment and the second embodiment are compared, the time required for computation is almost the same, however, the file size of the second embodiment is slightly larger than that of the first embodiment. The reason of this is because in the second embodiment, interpolation is conducted even if one side of the image data is even to make the range of data distribution of the transformed value smaller.

What is claimed is:

1. An image compressing apparatus having a Wavelet transforming unit for compressing digitized image data using a Wavelet transform, said Wavelet transforming unit comprising:

means for extending image data areas to make the number of data of the object of transform in horizontal and vertical directions to be the nearest even number possible, with every one octave of resolution lowered when a Wavelet transform is conducted hierarchically based on multiple resolution analysis; and means for interpolating values in an extended image data area using data in an image data area before being extended, thereby conducting a Wavelet transform on data of the whole image data area comprised of the original and the interpolated image data area.

2. The image compressing apparatus as set forth in claim 1, further comprising:

means for reducing data of smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

3. An image restoring apparatus having an inverse Wavelet transforming unit restoring image data compressed by a Wavelet transform, said inverse Wavelet transforming unit comprising means for reducing a redundant portion, generated by extension of an image data area by adding data thereto in the image data compression, so that the number of transformed data, in each of horizontal and vertical directions, coincides with the number thereof, whether odd or even, before conducting the corresponding compression, with every one octave of resolution increased.

4. An image compressing apparatus having a Wavelet transforming unit for compressing digitized image data using a Wavelet transform, said Wavelet transforming unit comprising:

means for extending an image data area to make the number of data of the object of transform in horizontal and vertical directions coincide with a number which can be divided by 2 raised to the power of n (n=a desired number of hierarchy) in advance, when a Wavelet transform is conducted hierarchically based on multiple resolution analysis; and means for interpolating values in an extended image data area using data in an image data area before being extended, thereby conducting a Wavelet transform on data of the whole image data area comprised of the original and the interpolated image data area.

5. The image compressing apparatus as set forth in claim 4, further comprising:

means for reducing data having a smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

6. An image restoring apparatus having an inverse Wavelet transforming unit restoring image data compressed by a Wavelet transform, said inverse Wavelet transforming unit comprising:

means for reducing a redundant portion, generated by extension of an image data area by adding data thereto in the image data compression, so that the number of transformed data, in each of horizontal and vertical directions, coincides with the original number thereof whether odd or even, after conducting an inverse Wavelet transform hierarchically.

7. An apparatus for transforming image data using a Wavelet transform, comprising:

an image compressing apparatus having a Wavelet transforming unit compressing digitized image data; and an image restoring apparatus having an inverse Wavelet transforming unit restoring the image data compressed by said image compressing apparatus, said Wavelet transforming unit in the image compressing apparatus including means for extending image data areas to make the number of data of the object of transform in horizontal and vertical directions to be the nearest even numbers possible, with every one octave of resolution lowered when a Wavelet transform is conducted hierarchically based on multiple resolution analysis, thereby conducting a Wavelet transform on data of the whole image data area comprised of the original and the interpolated image data area, and said inverse Wavelet transforming unit in the image restoring apparatus including means for reducing a redundant portion generated by extension of an image data area in the image data compression so that the number of transformed data in horizontal and vertical directions coincides with the number before conducting the corresponding compression, with every one octave of resolution increased.

8. The apparatus as set forth in claim 7, wherein said image compressing apparatus further comprises:

means for reducing data having a smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

9. An apparatus for transforming image data using a Wavelet transform, comprising:

an image compressing apparatus having a Wavelet transforming unit compressing digitized image data; and an image restoring apparatus having an inverse Wavelet transforming unit restoring image data compressed by said image compressing apparatus;

said Wavelet transforming unit in the image compressing apparatus including means for extending an image data area to make the number of data of the object of transform in horizontal and vertical directions coincide with a number which can be divided by 2 raised to the power of n (n=desired number of hierarchy) in advance, when a Wavelet transform is conducted hierarchically based on multiple resolution analysis; and means for interpolating values in an extended image data area using data in the image data area before being extended, thereby conducting a Wavelet transform on data of the whole image data area comprised of the original and interpolated image data area, said Wavelet transforming unit in the image restoring apparatus including means for reducing a redundant portion generated by extension of an image data area in the image data compression so that the number of transformed data in horizontal and vertical directions coincides with the original number, after conducting an inverse Wavelet transform hierarchically.

10. The apparatus as set forth in claim 9, wherein the image compressing apparatus further comprises:

means for reducing data having a smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

11. A method of compressing digitized image data using a Wavelet transform, comprising the steps of:

extending image data areas to make the number of data of the object of transform in horizontal and vertical directions to be the nearest even number possible, with every one octave of resolution lowered when a Wavelet transform is conducted hierarchically based on multiple resolution analysis; and interpolating values in an extended image data area using data in an image data area before being extended, thereby conducting a Wavelet transform on data of the whole image data area comprised of the original and the interpolated image data area.

12. An image compressing apparatus having a Wavelet transforming unit for compressing digitized image data using a Wavelet transform, said Wavelet transforming unit comprising:

means for extending an image data area by adding data thereto so as to make the number of data of the object of transform, in each of horizontal and vertical directions, if odd, to be the next higher number, with every one octave of resolution lowered when a Wavelet transform is conducted hierarchically based on multiple resolution analysis; and means for interpolating values in an extended image data area using data in an image data area before being extended, thereby conducting a Wavelet transform on data of the whole image data area comprised of the original and the interpolated image data area.

13. The image compressing apparatus as set forth in claim 12, further comprising:

means for reducing data of smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

14. An image compressing apparatus having a Wavelet transforming unit for compressing digitized image data using a Wavelet transform, said Wavelet transforming unit comprising:

means for extending an image data area by adding data thereto so as to make the number of data of the object of transform, in each of horizontal and vertical directions, if odd, coincide with a next higher number which can be divided by 2 raised to the power of n (n=a desired number of hierarchy) in advance, when a Wavelet transform is conducted hierarchically based on multiple resolution analysis; and means for interpolating values in an extended image data area using data in an image data area before being extended, thereby conducting a Wavelet transform on data of the whole image data area comprised of the original and the interpolated image data area.

15. The image compressing apparatus as set forth in claim 13, further comprising:

means for reducing data having a smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

16. An apparatus for transforming image data using a Wavelet transform, comprising:

an image compressing apparatus having a Wavelet transforming unit compressing digitized image data; and an image restoring apparatus having an inverse Wavelet transforming unit restoring the image data compressed by said image compressing apparatus, said Wavelet transforming unit in the image compressing apparatus including means for extending image data areas by adding data thereto so as to make the number of data of the object of transform, in each of horizontal and vertical directions, to be the next higher number, with every one octave of resolution lowered when a Wavelet transform is conducted hierarchically based on multiple resolution analysis, thereby conducting a Wavelet transform on data of the whole image data area comprised of the original and the interpolated image data area, and said inverse Wavelet transforming unit in the image restoring apparatus including means for reducing a redundant portion, generated by the extension of the image data area by adding data thereto in the image data compression, so that the number of transformed data, in each of horizontal and vertical directions, coincides with the number thereof, whether odd or even, before conducting the corresponding compression, with every one octave of resolution increased.

17. The apparatus as set forth in claim 16, wherein said image compressing apparatus further comprises:

means for reducing data having a smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

18. An apparatus for transforming image data using a Wavelet transform, comprising:

an image compressing apparatus having a Wavelet transforming unit compressing digitized image data; and an image restoring apparatus having an inverse Wavelet transforming unit restoring image data compressed by said image compressing apparatus;

said Wavelet transforming unit in the image compressing apparatus including means for extending an image data area by adding data thereto so as to make the number of data of the object of transform, in each of horizontal and vertical directions, coincide with a next higher number which can be divided by 2 raised to the power of n (n=desired number of hierarchy) in advance, when a Wavelet transform is conducted hierarchically based on multiple resolution analysis; and means for interpolating values in an extended image data area using data in the image data area before being extended, thereby conducting a Wavelet transform on data of the whole image data area comprised of the original and interpolated image data area, said inverse Wavelet transforming unit in the image restoring apparatus including means for reducing a redundant portion generated by the extension of the image data area by adding data thereto in the image data compression, so that the number of transformed data, in of horizontal and vertical directions, coincides with the original number thereof, whether odd or even, after conducting an inverse Wavelet transform hierarchically.

19. The apparatus as set forth in claim 18, wherein the image compressing apparatus further comprises:

means for reducing data having a smaller amplitude among data transformed by said Wavelet transforming unit; and means for conducting entropy-coding with respect to said reduced data, wherein said means for reducing data determines a threshold value of data to be reduced by quantitatively estimating a quality of the image after restoration.

* * * * *